(12) United States Patent
Anzai et al.

(10) Patent No.: US 7,852,740 B2
(45) Date of Patent: Dec. 14, 2010

(54) INFORMATION RECORDING MEDIUM STORING SYSTEM AND STORING CASE

(75) Inventors: Yumiko Anzai, Ome (JP); Akemi Hirotsune, Saitama (JP); Masaki Mukoh, Tokyo (JP); Youichi Horii, Mitaka (JP); Hiroko Sukeda, Tokorozawa (JP); Rieko Otsuka, Fuchu (JP); Takeshi Hoshino, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 923 days.

(21) Appl. No.: 11/696,284

(22) Filed: Apr. 4, 2007

(65) Prior Publication Data

US 2007/0284271 A1   Dec. 13, 2007

(30) Foreign Application Priority Data

Jun. 8, 2006    (JP) .............................. 2006-160028

(51) Int. Cl.
*G11B 5/84* (2006.01)
(52) U.S. Cl. ...................................... 369/274
(58) Field of Classification Search ................. 369/274, 369/275.1, 275.3, 275.4, 274.5
See application file for complete search history.

(56) References Cited

U.S. PATENT DOCUMENTS 7,643,401 B2 *   1/2010   Takahashi et al. ........ 369/275.4

| | | | |
|---|---|---|---|
| 2003/0001943 A1 | 1/2003 | Hirotsune et al. | |
| 2003/0218941 A1 | 11/2003 | Terao et al. | |
| 2005/0007936 A1 | 1/2005 | Terao | |
| 2005/0180304 A1 * | 8/2005 | Onodera et al. | 369/275.3 |
| 2005/0243338 A1 | 11/2005 | McClellan | |
| 2005/0270964 A1 * | 12/2005 | Ujino | 369/274 |
| 2005/0276211 A1 | 12/2005 | Hirotsune et al. | |

FOREIGN PATENT DOCUMENTS

| | | |
|---|---|---|
| FR | 2 759 881 | 8/1998 |
| GB | 2 332 298 | 6/1999 |
| JP | 8-167269 | 6/1996 |
| JP | 2000-195225 | 7/2000 |
| JP | 2003-016649 | 1/2003 |
| JP | 2003-346378 | 12/2003 |
| JP | 2005-235359 | 9/2005 |
| JP | 2005-317187 | 11/2005 |
| JP | 2005-350093 | 12/2005 |
| JP | 2006-228358 | 8/2006 |
| WO | WO 2005/038758 | 4/2005 |

* cited by examiner

*Primary Examiner*—Allen T Cao
(74) *Attorney, Agent, or Firm*—Antonelli, Terry, Stout & Kraus, LLP.

(57) ABSTRACT

An information recording medium capable of displaying multiple labels and a storing case for the information recording medium are provided. The multiple labels are displayed by changing the labels to be displayed while selectively selecting information layers in a multi information recording medium. The medium has a function to receive either voltage or current, and the information layers selectively receive either voltage or current for changing the labels.

17 Claims, 21 Drawing Sheets

INFORMATION RECORDING MEDIUM STORING SYSTEM AND STORING CASE

CLAIM OF PRIORITY

The present application claims priority from Japanese application JP 2006-160028 filed on Jun. 8, 2006, the content of which is hereby incorporated by reference into this application.

BACKGROUND OF THE INVENTION

1. Field of the Invention

The present invention relates to a label for displaying multiple visible characters and/or images on an information recording medium formed as a multi information medium for recording by irradiation of energy and configured to record and reproduce information by using light. The present invention relates to a storing case and a storing system therefor.

2. Description of the Prior Art

Conventional information recording media used for recording and reproducing information by using light include CD-R, CD-RW, DVD-RW, DVD+RW, DVD-RAM, Blu-ray Disc, and so forth. In order to distinguish contents recorded on a medium, a user prints a photograph, a title, a file name, a date or the like on a label side with a printer, writes such information with a pen or the like, or prints such information on a sticker and attaches the sticker onto the label side, for example. Printers capable of printing labels include a dedicated printer designed solely for printing labels and a universal printer equipped with an optional device for printing labels. There is also proposed a method of printing labels with a dedicated printer not only on information recording media but also on storing cases.

Alternatively, there is also a method of forming a label by use of a laser beam for reading and recording. In this method, a laser-beam absorption layer is formed on a label side in advance, and a label is formed by arbitrarily irradiating the layer with a laser beam. Since the label side is located on the other side of a reading or recording side, a label is formed either by inserting a disc upside down or by disposing laser irradiators on both sides. In this case, it is possible to form a label by use of the same device as that for reading and recording.

Instead, another information recording medium other than the above is a voltage-selection-type multi information recording medium. This medium has a structure including multiple recording layers each made of an electrochromic material. On this information recording medium, information is recorded in the following manner. Firstly, a voltage is applied to the recording layers while sandwiching them between a pair of electrodes. Then the recording layers absorb light while the absorption spectrum thereof is being changed by the voltage application, and thereby the information is recorded by selectively coloring the recording layers.

[patent document 1] Japanese Patent Application Publication No. 2005-235359

[patent document 2] Japanese Patent Application Publication No. 2005-350093

[patent document 3] Japanese Patent Application Publication No. 2005-317187

[patent document 4] Japanese Patent Application Publication No. 2003-16649

[patent document 5] Japanese Patent Application Publication No. 2003-346378

SUMMARY OF THE INVENTION

An information recording medium includes a data side for reading and recording information, and a label side. The label side is used for forming a label. For the purpose of printing the label with a printer, it is necessary to prepare a dedicated printer and/or an information recording medium provided with a dedicated label layer. In addition, it is troublesome to replace the information recording medium, for example. The dedicated printer occupies a space, and is therefore obtrusive. Moreover, the price of the information recording medium provided with the dedicated label layer is an extra price. Moreover, the data side or the label side of the conventional information recording medium consists of only a single layer, and this does not allow a label to be displayed and not to be displayed, selectively. The same problems apply to label printing on a storing case.

An object of the present invention is to provide a multi information recording medium capable of displaying multiple labels selectively and simply, and to provide a storing case (a jacket) therefor.

Labels to be displayed are changed by selecting information layers in a multi information recording medium, and thereby multiple labels are displayed. The medium has a function to receive either voltage or current, and the information layers selectively receive the voltage or the current to change the labels. It is possible to use a single layer or multiple layers to display the labels. When the single layer is used, the label is displayed either in a single color or in two colors. Meanwhile, when multiple layers are selected, it is possible to display the label at high gradation and in multiple colors by using the colors of the respective layers.

A storing case for storing the multi information recording medium is provided with voltage applying means that supplies the voltage or the current to a desired layer of the multi information recording medium to display the label. It is also possible to cause the storing case to display an arbitrary label by providing the storing case with a function to change the label display in response to a signal input. By providing an aperture to a part of the storing case, it is possible to view the label which is displayed on the medium stored in the storing case.

Label recording can be achieved by forming an image for the label in advance on a personal computer or the like, and then by recording the image by use of the drive for recording ordinary information. The drive recognizes positions of pixels in the image data not by use of the x-y coordinate system as typically applied to the personal computer but by use of the polar coordinates defined by the respective radii r and angles θ. Accordingly, it is necessary to convert the x-y coordinates indicating each pixel position into the polar coordinates at the time of producing a label on a selected label layer. Such conversion is executed by the personal computer or by a calculation circuit embedded in the drive.

The image data is displayed on the personal computer in a combination of three-color brilliance based on RGB (red, green, and blue). Accordingly, the RGB values on each coordinate point are extracted and caused to correspond to different label layers. For example, when three label layers are provided, each label layer corresponds to each color of RGB. By recording on an electrochromic layer, which is to constitute a label layer to be colored, at laser power corresponding to the brilliance, it is possible to produce the electrochromic layer which can display a label at the time of voltage application. A position recorded at large laser power is not colored at the time of voltage application, and the RGB values of the position are nearly 0.

For example, when a blue color is to be emphasized, only an electrochromic layer configured to change into blue is recorded at small laser power. The rest of layers for red and green colors are recorded at large laser power. Meanwhile, when a white color is to be displayed, all of the electrochromic layers are recorded at large laser power. The position to be displayed in black need not be recorded. In this case, each layer is colored at the time of voltage application, and the label therefore looks black.

According to the present invention, it is possible to display an impressive label.

DETAILED DESCRIPTION OF THE PREFERRED EMBODIMENTS

Now, embodiments of the present invention will be described below with reference to the accompanying drawings.

First Embodiment

Configuration examples of a multi information recording medium and of a storing case for changing labels in the present invention are as follows.

Figure 1:
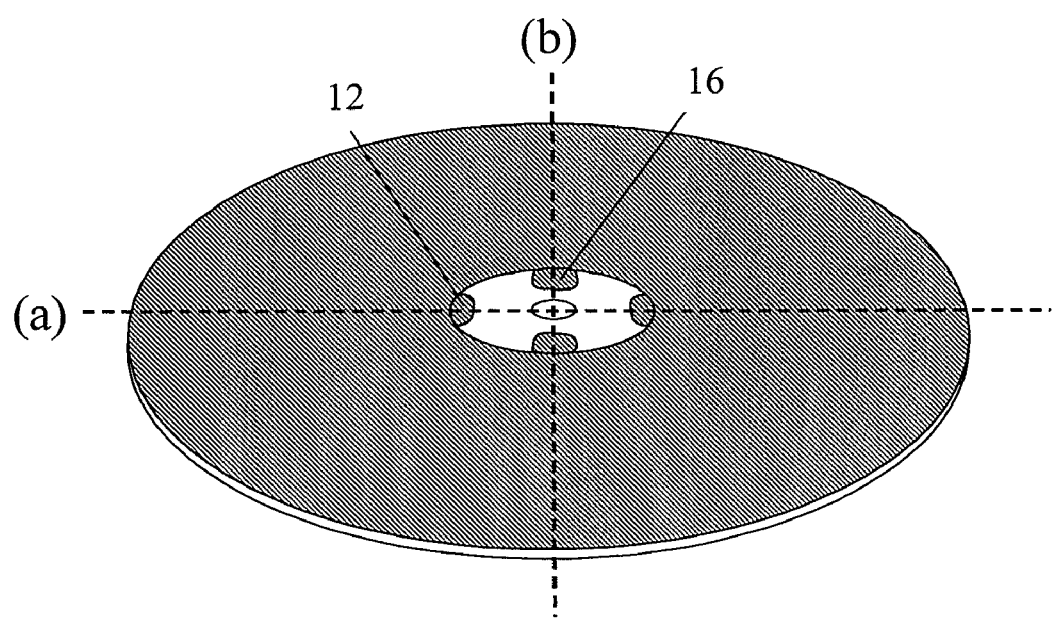
FIG. 1 is a view showing a layout of transparent electrodes in a multi information recording medium.
Figure 2A:
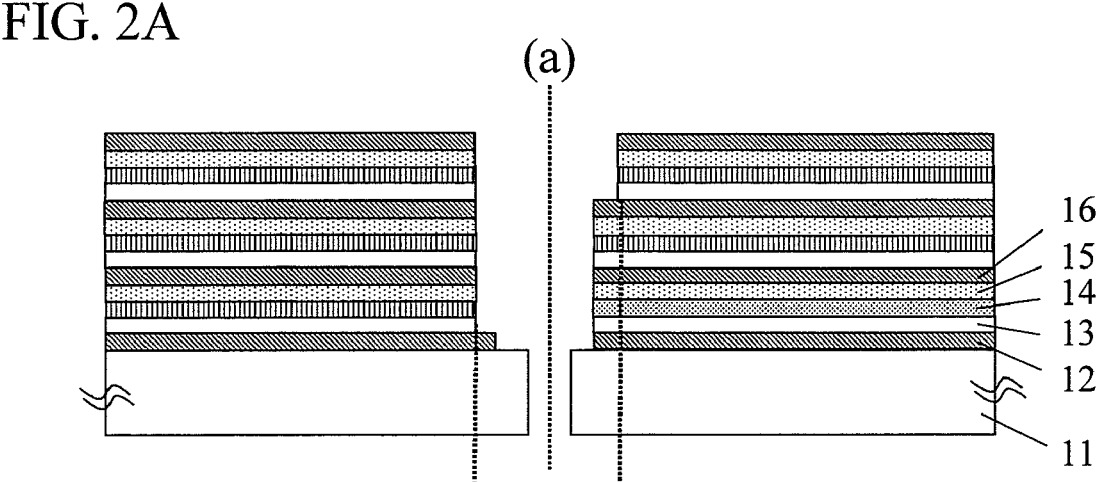
FIGS. 2A and 2B are cross-sectional views showing an example of the multi information recording medium.
Figure 2B:
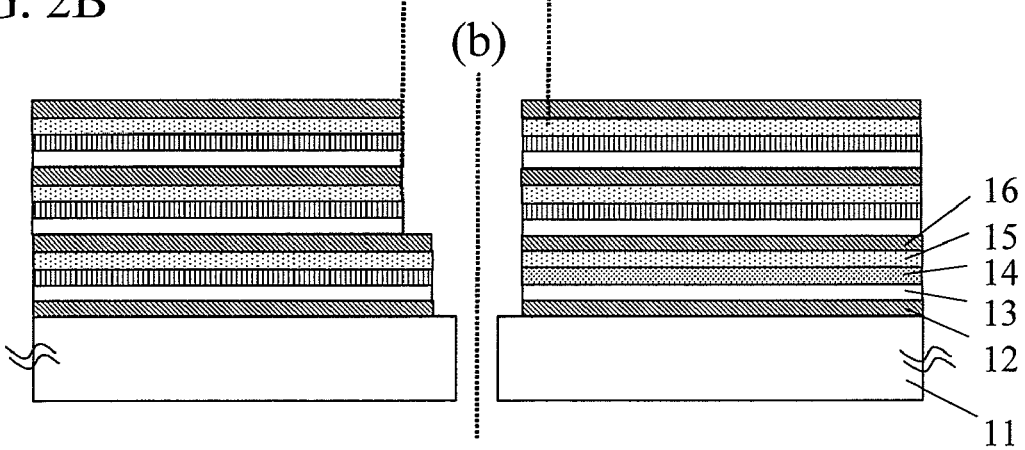

FIG. 1 is a plan view showing a layout example concerning areas for selecting transparent electrodes in the produced multi information recording medium. Portions of the transparent electrodes formed in the inner peripheral area are respectively provided on every set of layers which are electrically separated from one another. A mask designed to be deposited only partially on the inner periphery is used when the transparent electrodes are deposited. The mask is shifted and deposited for each transparent electrode in a circumferential direction. In this way, the portions of the transparent electrodes are arranged as shown in FIG. 1. Each of FIGS. 2A and 2B show a cross-sectional structure of the medium, which is taken along the A line and the B line in FIG. 1, respectively. The medium has a structure, sandwiched by transparent electrodes, which is formed by sequentially depositing a first transparent electrode layer (ITO) 12, a first reduction type electrochromic layer ($WO_3$) 13, a first solid electrolyte layer ($Ta_2O_5$) 14, a first oxidized form electrochromic layer ($IrO_x$) 15, and a second transparent electrode layer (ITO) 16, and at least two sets of such structures are repeatedly stacked on a substrate 11 with a space layer interposed between the structures when necessary in light of the optical or thermal requirement. Here, as an example, ten sets of such structures are deposited in total, and among them, three sets are used for label display whereas seven sets are used for recording information.

Figure 3A:
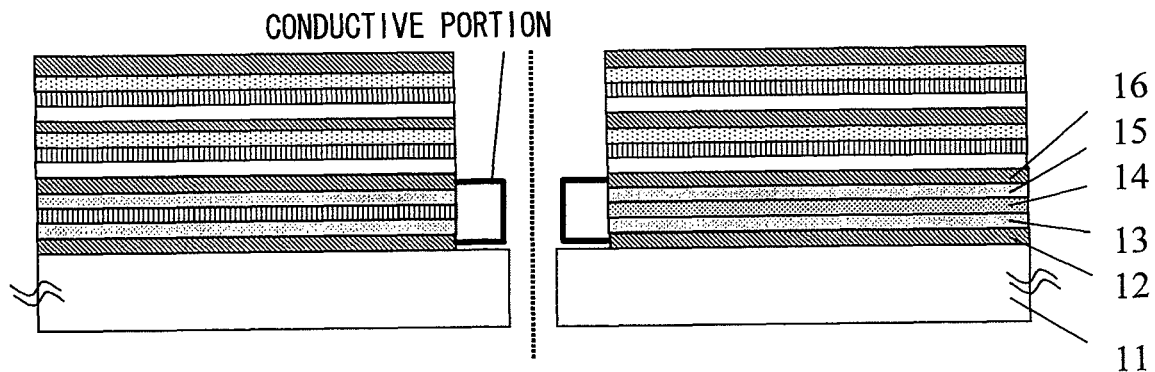
FIGS. 3A to 3C are explanatory views for changing label displays.
Figure 3B:
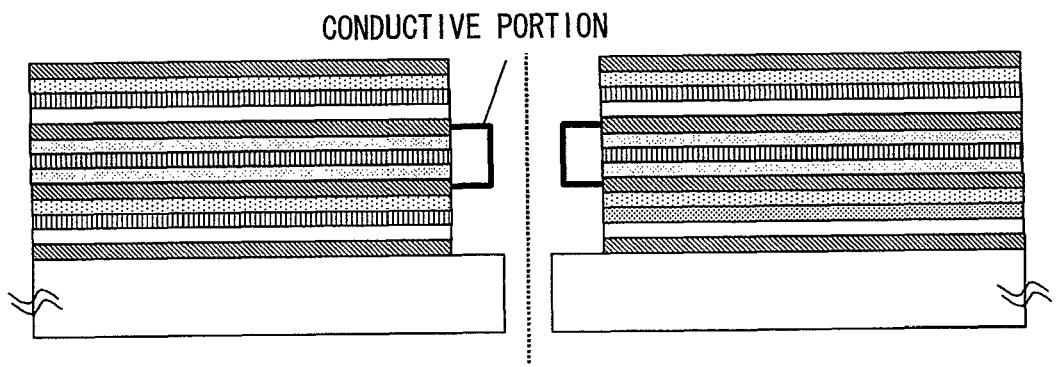
Figure 3C:
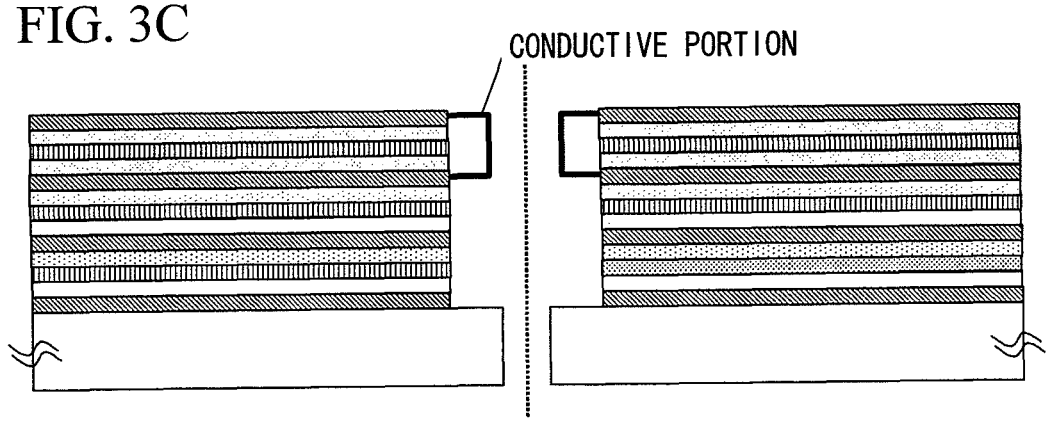

FIGS. 3A to 3C show examples of changing displays of three labels provided on the multi information recording medium. The layers sandwiched by a pair of the transparent electrodes function as a label. The labels are changed arbitrarily by selecting the transparent electrode that corresponds to one of the labels.

Figure 4:
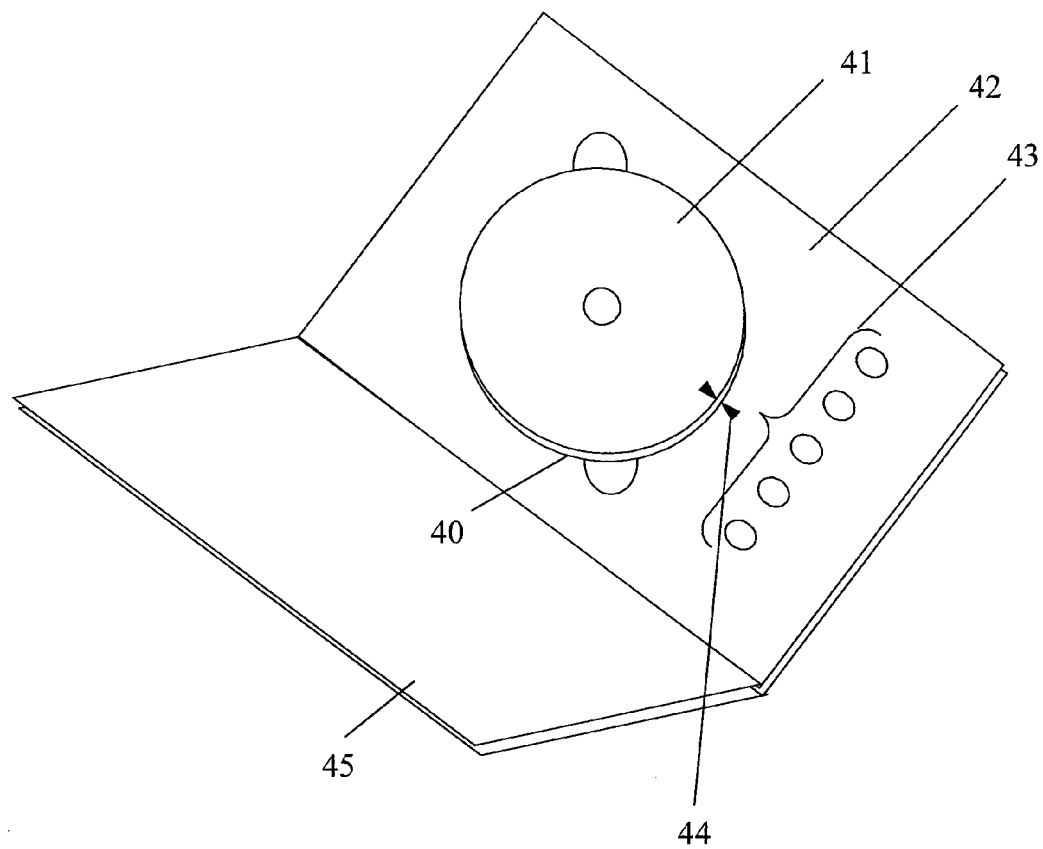
FIG. 4 is a view showing a storing case storing the multi information recording medium.

FIG. 4 shows an example of a storing case that stores the above-described medium. A storing part 40 with a shallow dent shape capable of storing a disc 41 is provided in a storing case 42, and selecting means 43 for selecting the labels is attached thereto. The medium 41 and the storing case 42 are provided with marks 44 for alignment. The medium 41 is stored in the storing case such that the mark on the medium 41 is aligned with the mark provided on the storing case. Moreover, the storing case is provided with a lid 45 which opens and closes freely for covering the storing part 40.

Figure 5:
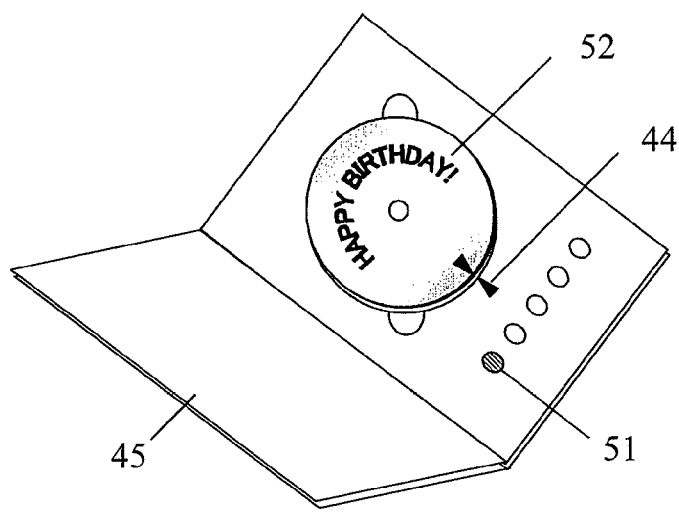
FIGS. 5A to 5C are views showing a method of changing the label displays.
Figure 5:
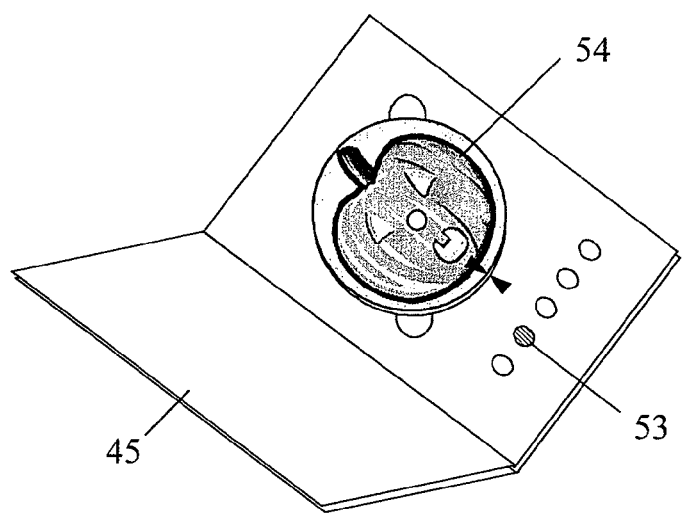
Figure 5:
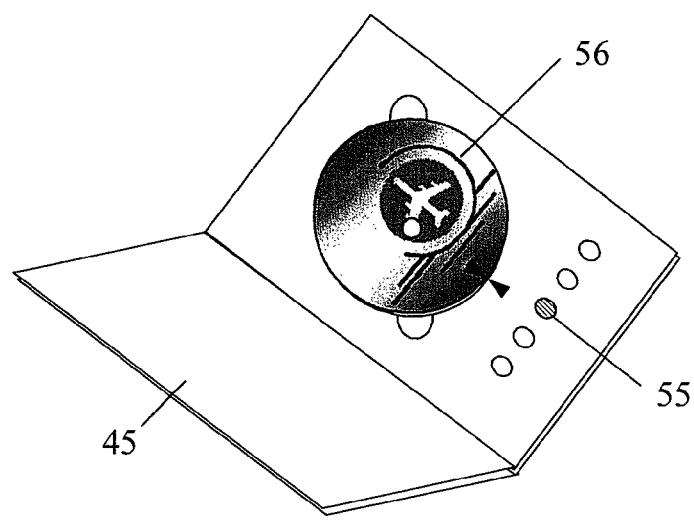

FIGS. 5A to 5C show examples of a method of changing the labels to be displayed. As shown in FIG. 5A, when a label button 51 is pressed, a voltage is applied to a corresponding pair of the electrodes in the multi information recording medium, and a label 52 recorded in advance on relevant layers is displayed. As shown in FIG. 5B, when a label button 53 is pressed, a voltage is applied to another pair of the electrodes, whereby a label 54 recorded on relevant layers is displayed similarly. As shown in FIG. 5C, when a label button 55 is pressed, a voltage is applied to still another pair of the electrodes, whereby a different label 56 recorded on relevant layers is displayed similarly.

Figure 6:
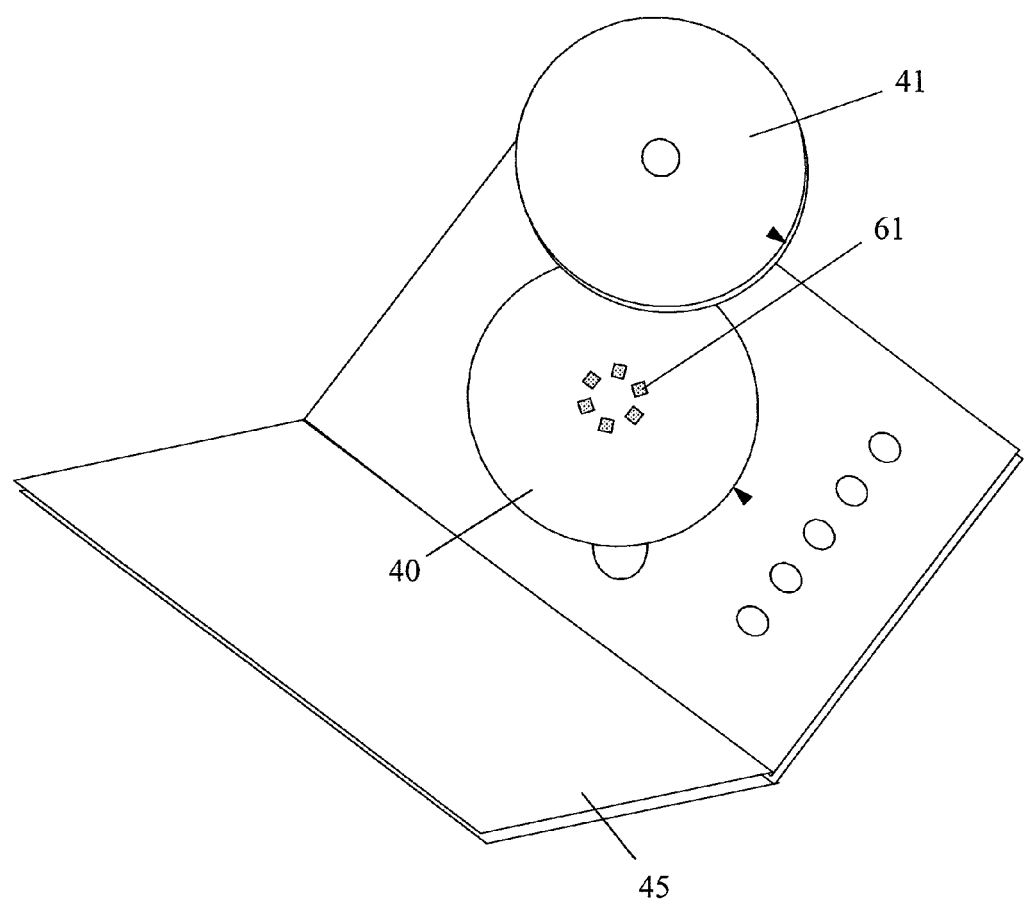
FIG. 6 is a view showing a layout of terminals for applying voltage on the storing case.
Figure 7:
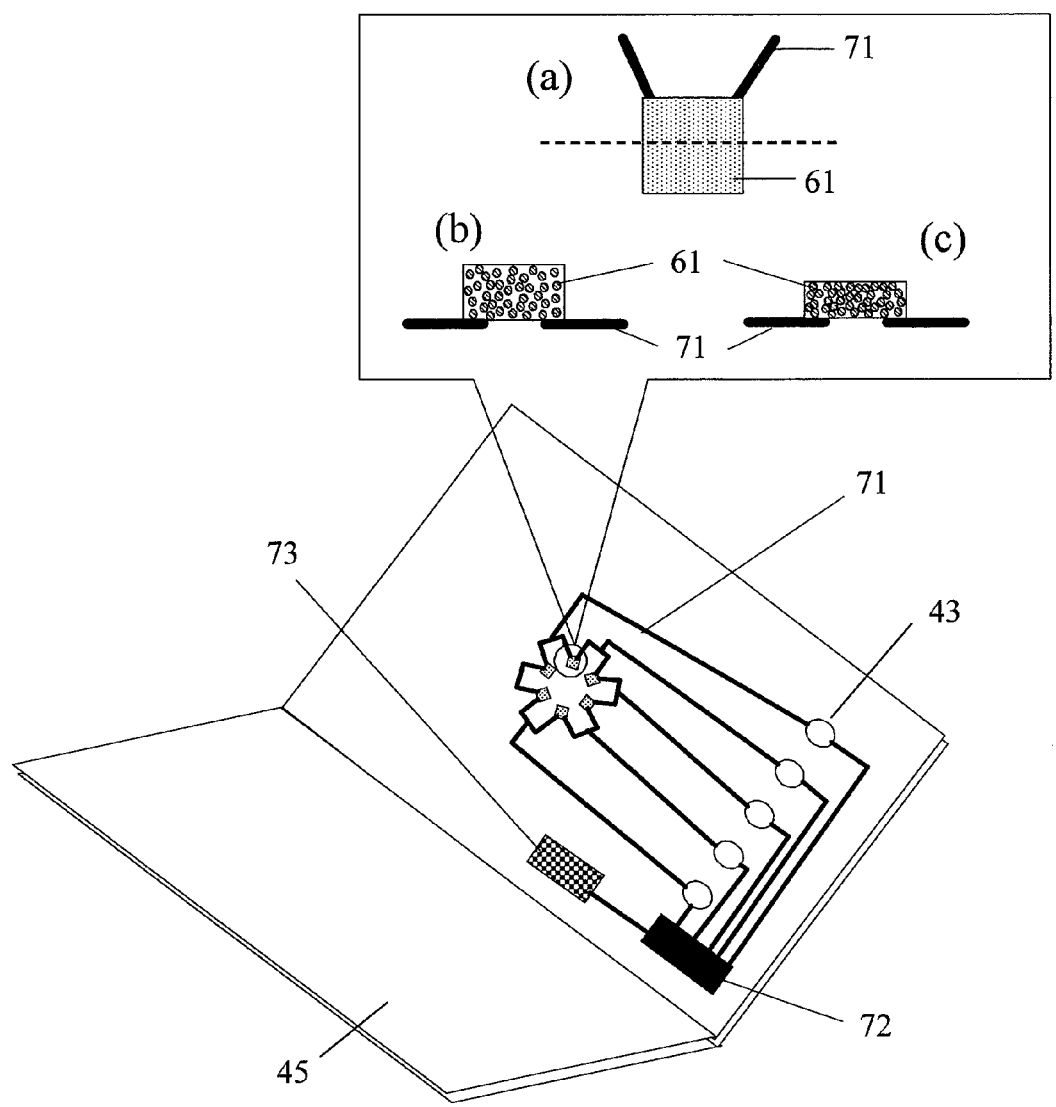
FIG. 7 is a view showing a configuration example of the storing case.

FIG. 6 shows a layout example of the buttons constituting the label selecting means and the electrode portions on the inner periphery of the disc. Terminals 61 for applying voltage are provided on the storing case, the terminal 61 corresponding to positions of terminals to be connected to the transparent electrodes on the inner periphery of the disc, so that the transparent electrode area of the disc is connected to the terminals for applying voltage on the storing case. FIG. 7 is a wiring diagram of the buttons and the terminals 61 for applying voltage. The terminals for applying voltage on the storing case indicated in FIG. 7 is made of a soft material which is deformed flexibly in a thickness direction so as to match the difference of height between the transparent electrodes on the disc. The terminal is, for example, a zebra connector which is formed by stacking soft material sheets and conductive materials alternately. Although the thickness of the terminal 61 for applying voltage changes as shown in schematic cross-sectional views (b) and (c), the terminal 61 is still electrically conductive irrespective of the change in the thickness. Moreover, as shown in FIG. 7, the storing case is provided with a voltage source 73 such as a battery, voltage supplying means 72 having a function to divide voltage received from the voltage source 73 and to supply the voltage to selected wiring lines 71, and the wiring lines 71 connecting the label selecting means 43 to the terminals 61 for applying voltage.

A battery small in size is used as the voltage source. A button-type small battery such as a lithium battery or an alkaline battery has electromotive force in a range from 1.5 V to 3.0 V, which is the sufficient voltage supply amount for label display. It is possible to produce the storing cases in various shapes by utilizing small and thin-profile characteristics. Moreover, it is possible to supply stable electric power without being influenced by brightness in a use environment. A small coin-shaped lithium battery having a diameter of 10 mm, a height of 2.5 mm, and a weight of 0.7 g is used in this embodiment. A voltage of the battery is set to 3 V, and a nominal capacity thereof is set to 30 mAh.

Figure 8:
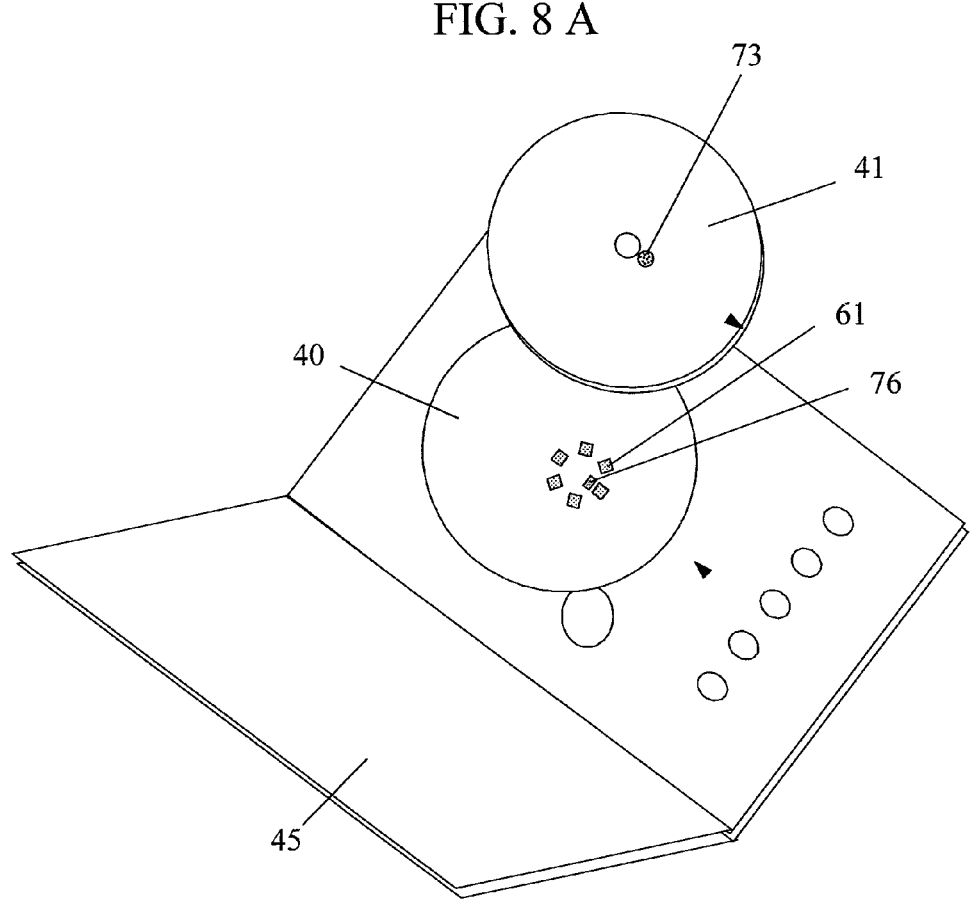
FIGS. 8A and 8B are views showing an example of disposing a voltage source on the information recording medium.
Figure 8:
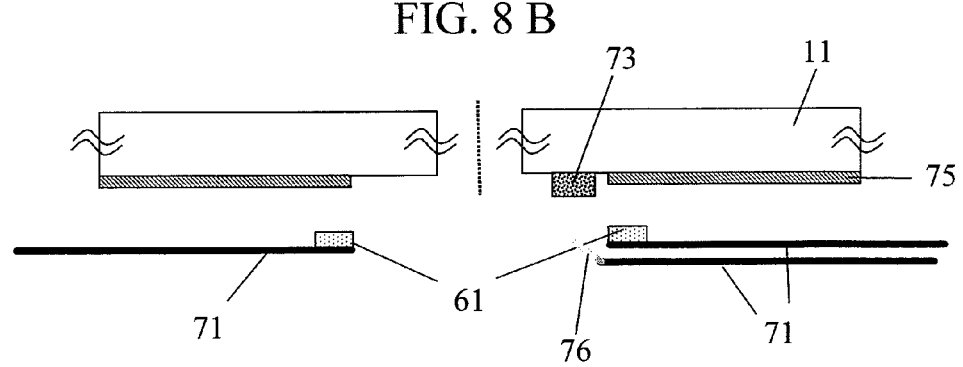

Alternatively, it is possible to attach the small battery 73 functioning as the voltage source to the disc 41 as shown in FIG. 8A. In this case, it is preferable to use the battery small in size. It is also possible to embed the small battery or to form a battery structure inside the disc 41. Since a Si cell of a solar battery is formed by semiconductor processes, the Si cell has a high affinity with processes for forming an optical disc. FIG. 8B is a view showing a cross section of the disc and a cross section of the storing case when the voltage source is attached to the disc. The voltage source 73 is disposed at an inner peripheral portion of the disc. It is possible to supply the voltage by setting the disc on the storing case. Here, the transparent electrodes in the disc are connected to the terminals for applying voltage on the storing case. A voltage receiver 76 is preferably formed into a flat spring and rendered flexible in the height direction so that the receiver is securely connected to the voltage source 73 or a terminal connected thereto.

The transparent electrodes inside the disc do not always have to contact the terminals for applying voltage on the storing case as long as the a voltage is conductive therebetween.

Instead of $WO_3$, it is also possible to use other reduction type electrochromic materials including Prussian blue ($K_xFe^{II}_yFe^{III}_z(CN)_6$) which is iron cyanide, $MoO_3$, $Nb_2O_5$, $V_2O_5$, $TiO_2$, NiOOH, CoOOH, $Rh_2O_3$, $IrO_x$ (x is a positive number below 1), ZrNCl, InN, $SnN_x$ (x is a positive number below 1), $MnO_x$ (x is a positive number below 2), a $WO_3$—$MoO_3$ compounded (blended) thin film, and the like. It is also possible to use materials formed by adding Au, Ag, Cu and the like to the aforementioned materials. These materials can also be used as protective layers. Instead of $IrSnO_x$, it is possible to use other oxidized form electrochromic materials including NiOOH, CoOOH, tungsten oxalic acid complex, and organics such as heptylviologen.

The solid electrolyte has a structure formed by sandwiching any of the following laminated films between transparent or semitransparent electrodes: $WO_3$—$Ta_2O_5$—$IrO_x$, $WO_3$—$Cr_2O_3$, $WO_3$—$MgF_2$, $WO_3$—$RbAg_4I_5$, $WO_3$—SiO, $WO_3$—$ZrO_2$, $WO_3$—$LiClO_4$, $WO_3$—LiF, $WO_3$—$Na_3Zr_2Si_2PO_{12}$ (NASICON), $WO_3$—$NaYSi_4O_{12}$, and the like. It is also possible to replace part of or all of $WO_3$ in these materials with the above-mentioned other inorganic electrochromic materials such as $MoO_3$.

As for the electrochromic materials, it is possible to use other materials which are not currently referred to as electrochromic materials as long as an absorption or reflection spectrum changes in such materials by voltage application. It is possible to form a small disc or a small recording medium even made of a single crystal. It should be noted, however, that it is preferable to use a material having light absorption equal to or below 10% or more preferably equal to or below 5% in a low-absorption state. Instead of the electrochromic materials, it is also possible to use a material obtained by blending an electroluminescent (EL) material with a photochromic material. The color of the photochromic material is allowed to change by light emitted from the EL material so as to cause light absorption relative to the wavelength of recording or reading light. It is possible to use an inorganic material such as ZnO as the EL material.

As the material of the transparent electrodes, it is possible to use a publicly-known transparent electrode material adopting a composition of $(In_2O_3)_x(SnO_2)_{1-x}$, in which x is set in a range from 5% to 99% or more preferably in a range from 90% to 98% in terms of a resistance value. It is also possible to use other publicly-known material obtained by adding $SiO_2$ in an amount not exceeding 50 mol % to the above-described material or material obtained by adding 2 mol % to 5 mol % of another oxide such as $Sb_2O_3$ to the $SnO_2$ in the above-described composition, for example.

Moreover, it is possible to provide two or more layers of space layers. Here, it is more favorable to impart an adiabatic effect to the space layers. Although the adiabatic layer may be conductive, it is preferable to eliminate such conductivity. For example, ZnS—$SiO_2$ can be used in this case.

Concerning image data, writing data used by a disc tester are formed by converting x-y coordinate positions of respective pixels to inverse polar coordinates on a personal computer. The writing data include information on pixels in one round of each disc on a radius of the disc basis. The size of one pixel on a disc label corresponds to a spot size of a laser. It is by all means possible to form one pixel by use of multiple laser spots. The size of laser spot and the size of label area determine specifications of the required image data. In this embodiment, the bitmap (bmp) file including image data equivalent to 1800×1800 pixels is used in order to produce a label on the disc substrate having a diameter of 12 cm by use of laser spots each having a size of 50 μm. A comma separated value (csv) file indicating RGB values of the respective pixels is made from this bmp file to execute inverse polar coordinate calculation. The file after the inverse polar coordinate conversion is in conformity with rθ expression. The writing data are produced based on the data thus obtained. After a recording layer is selected by applying a voltage to the recording layer in accordance with the writing data, the label is produced by performing irradiation of laser onto an electrochromic film on which a label layer is to be formed. In this embodiment, a laser having a wavelength of 660 nm and numerical aperture (NA) of 0.65 is applied. However, it is also possible to apply a laser having a wavelength of 405 nm and NA of 0.85 instead. In order to form a recognizable label, it is essential to provide a contrast difference between a recorded area and an unrecorded area. In this embodiment, an obtained contrast ratio of optical reflectivity of the recorded area to that of the unrecorded area is approximately equal to 2:1.

Figure 9:
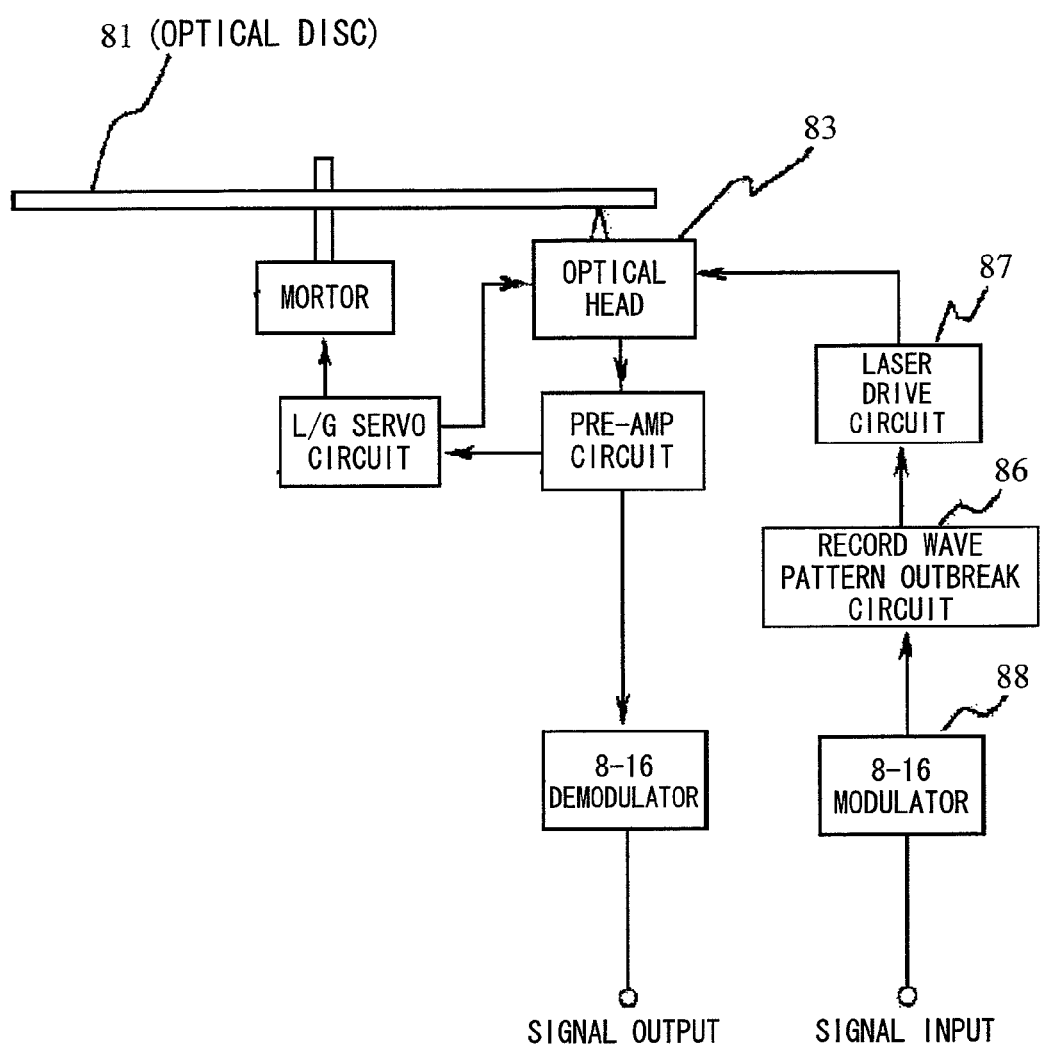
FIG. 9 is a diagram for explaining a recording and reproducing method.

Operations for recording and reproducing information in the case of using the medium as an information recording layer will be described with reference to FIG. 9. First, as a method of controlling a mortor at the time of recording and reproducing the information, a zoned constant linear velocity (ZCAV) method is used. In this method, the rotation speed of the disc is changed at each zone where recording and reproducing are performed. Then, every 8-bit data is defined as one unit, and the data are transferred to an 8-16 modulator 88. When information is recorded on an information recording medium 81, a modulation method of converting 8-bit information into 16-bit information is applied. This method is a so-called 8-16 modulation method. In this modulation method, each piece of information having a mark length ranging from 3 T to 14 T that corresponds to the 8-bit information is recorded on the medium. The 8-16 modulator 88 in the diagram performs this modulation. Here, the T represents a clock cycle at the time of recording the information. The disc is rotated such that a relative velocity to light spots becomes a linear velocity equal to 15 m/s. Digital signals each having the length ranging from 3 T to 14 T which are obtained by conversion by the 8-16 modulator 88 are transferred to a record wave pattern outbreak circuit 86, and a multi-pulse recording waveform is generated.

In the record wave pattern outbreak circuit, the signal having the length from 3 T to 14 T is caused to correspond to "0" and "1" alternately in time sequence. Meanwhile, the record wave pattern outbreak circuit 86 includes a multi-pulse waveform table which is corresponding to a method referred to as control of adaptive recording waveform. In this method, the head pulse width and the end pulse width of the multi-pulse waveform are changed in response to lengths of space portions in front and back of mark portions at the time of forming a series of high-power pulse sequences for forming the mark portions. In this way, the record wave pattern outbreak circuit generates the multi-pulse recording waveform that can minimize the influence of heat interference being generated between the marks. The recording waveform generated by the record wave pattern outbreak circuit 86 is transferred to a laser drive circuit 87, and the laser drive circuit 87 causes a semiconductor laser in an optical head 83 to emit light based on this recording waveform.

Figure 10:
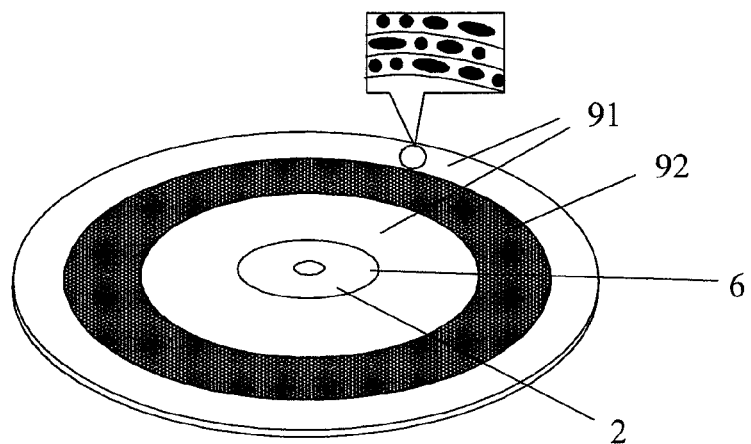
FIGS. 10A to 10C are views for explaining layouts of label areas and information recording areas.
Figure 10:
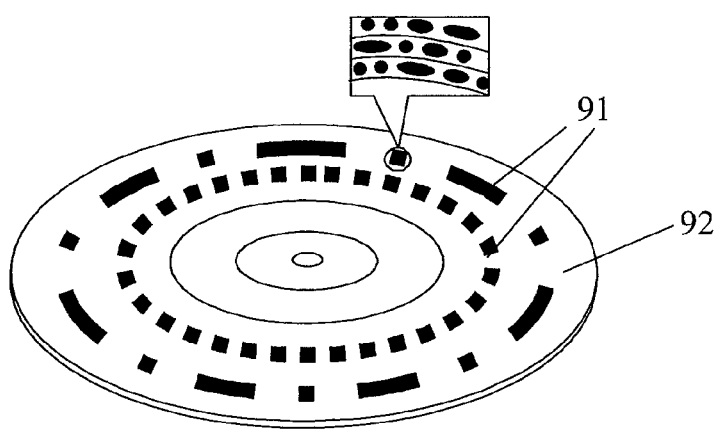
Figure 10:
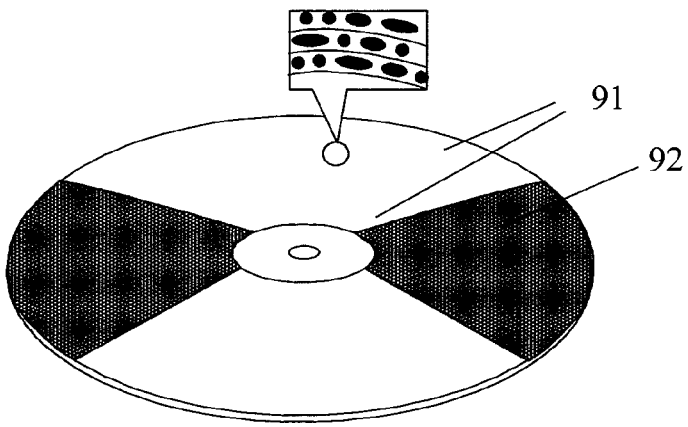

The rest of the layers not used as the label may be formed into either a write-once type or a rewritable type that can record information, into a read-only memory (ROM) type in which information is recorded in advance, or into a mixture of those types. Meanwhile, it is also possible to combine label information and recording information on the same layer instead of providing a layer used for label display and a layer used for recording information separately. FIGS. 10A to 10C show examples of information recording areas 91 and label areas 92 being mixed on the same layer. These areas are separately arranged in a radial direction, in a circumferential direction or at random. In any case, the sizes of these areas may be defined arbitrarily. FIG. 10A shows an example of a medium in which the information recording areas 91 and the label area 92 are separated in the radial direction. FIG. 10C shows an example of a medium in which the information recording areas 91 and the label areas 92 are separated in the circumferential direction. FIG. 10B shows an example of a medium in which the information recording areas 91 and the label areas 92 are randomly mixed.

In this way, it is possible to change labels to be displayed on the surface of a multi-layer information medium for recording by irradiation of energy, and thereby to display multiple types of labels thereon.

Second Embodiment

This embodiment will explain an example of using a different voltage source from the voltage source described in the first embodiment. FIGS. 11A and 11B show layout examples of storing cases in each of which a solar battery (photovoltaic [PV] cell) 77 is used as a voltage source. By using the solar cell, it is possible to display labels either indoors or outdoors without a need of replacing the battery in the storing case.

A typical PV cell utilizes a light electromotive force effect of semiconductor. The light electromotive force effect is caused by two factors, namely, a photoconduction effect and a drift effect. When light is irradiated on the semiconductor, electrons and positive holes are excited at a conductor and a charging electron band owing to transition between bands or transition between band and level. Conductivity is increased as the electrons and the positive holes behave as free carriers. If there is an inner electric field in this situation, the drift effect is activated, and the electromotive force is generated by polarization of generation carriers. Therefore, in the light electromotive force effect, it is essential that light having sufficient energy for generating electron and positive hole pairs be incident, and that points of generation of such electron and positive hole pairs be located in the vicinity of junctions.

In the case where silicon (Si) is used in the solar battery, the energy required for generating the electron and positive hole pairs corresponds to energy of light having a wavelength equal to or below 1 μm. Light from a fluorescent lamp used as a light source indoors has a wavelength in a range from 450 nm to 650 nm. Therefore, it is possible to obtain the voltage by use of the solar battery indoors.

Figure 11:
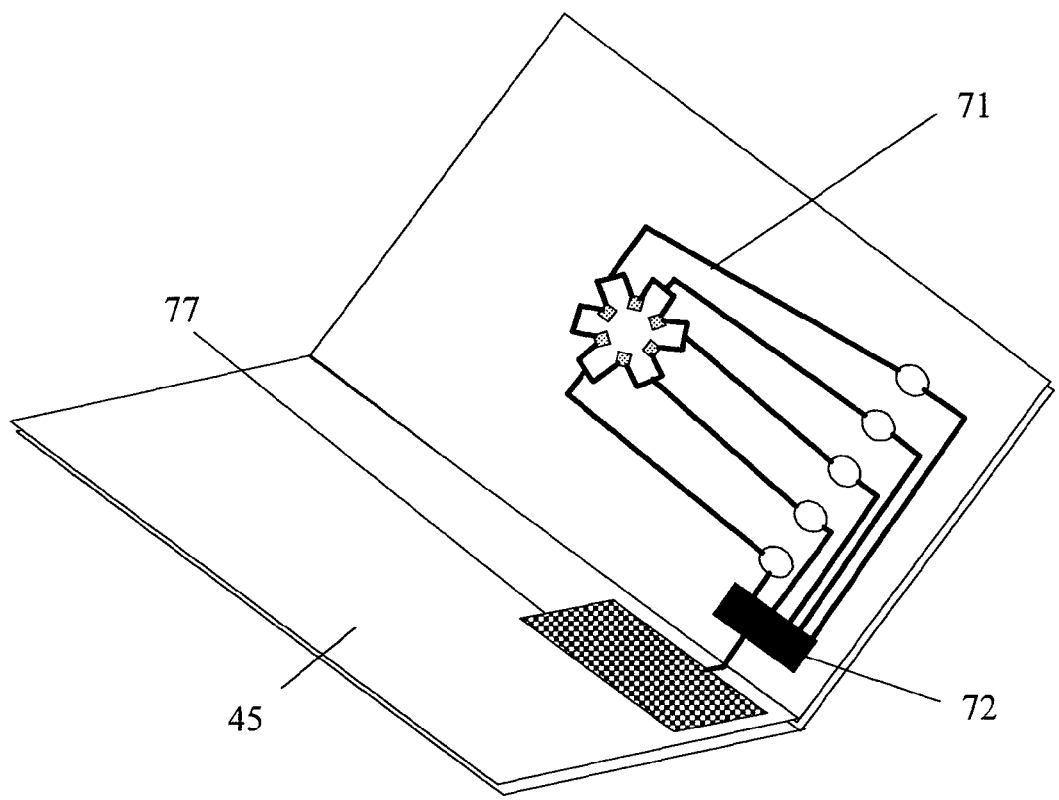
FIGS. 11A and 11B are views showing other configuration examples of the storing case.
Figure 11:
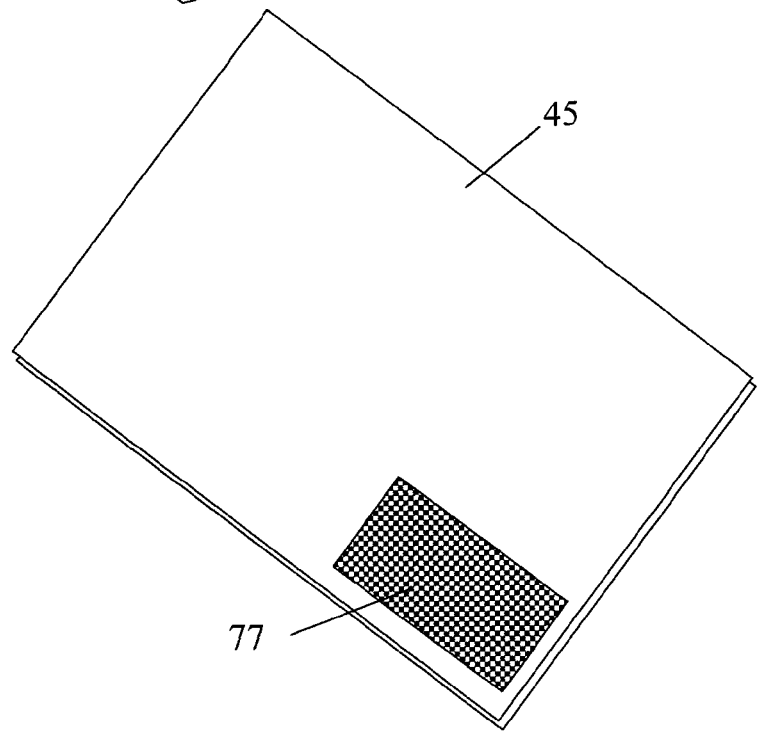

FIG. 11 shows an example of using the solar battery 77 that has specifications of a size of 62×83 mm, a voltage of 2 V, and a current of 250 mA. It is possible to expand the area of silicon cell by increasing the size of the solar battery, and thereby to increase both of the voltage and the current. Alternatively, by connecting multiple solar batteries in the same size in series or parallel, it is possible to acquire larger amounts of voltage and current than those of the single solar battery. Nevertheless, the single solar battery having a size of 62×83 mm is used in this embodiment considering the size of the optical disc. A voltage of 2 V corresponds to the rating voltage at the time of full output (when the load resistance is infinitely large) while a current of 250 mA corresponds to the maximum current applicable at the time of a short circuit (when the load resistance is equal to 0 Ω). The voltage is equal to 1.3 V when the indoor fluorescent lamp is used. The brilliance in this case is equal to 600 lux as a result of measurement with a luminometer.

The solar battery 77 may be located inside the storing case as shown in FIG. 11A or may be located on the outside of the storing case such as on the front surface of a lid 45 as shown in FIG. 11B. In the case of using a small solar battery (photovoltaic [PV] cell), the layout will be similar to that of FIG. 7.

Figure 12:
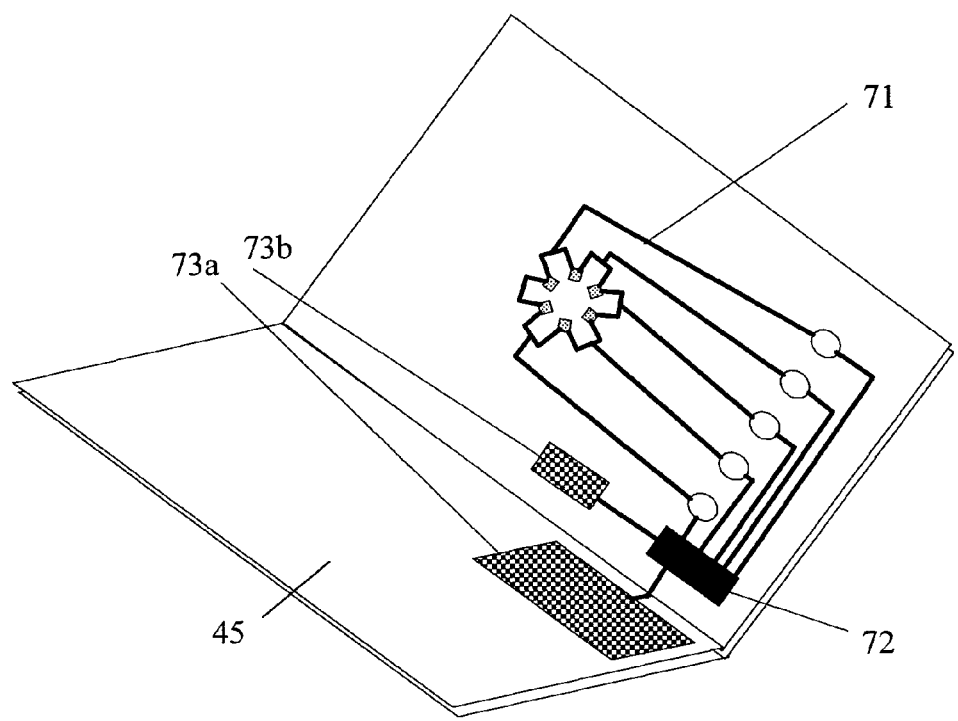
FIGS. 12A and 12B are views showing still other configuration examples of the storing case.
Figure 12:
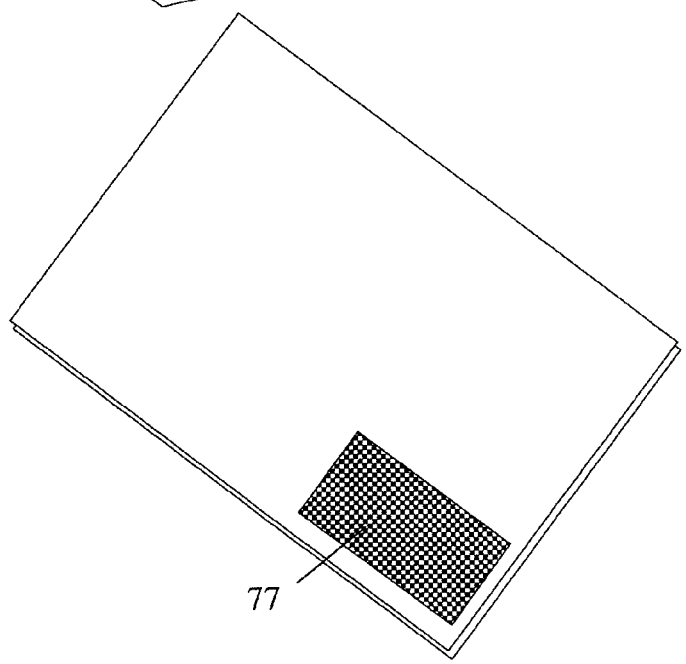

Meanwhile, it is also possible to combine a solar battery 73a with a battery 73b as represented by the nickel-cadmium battery as shown in FIGS. 12A and 12B. Although the solar battery generates the electromotive force under the light source, the brightness of the light source may vary indoors or outdoors. While the electromotive force of the solar battery may fluctuate in this case, it is possible to maintain the electromotive force constant at the time of displaying labels by embedding the battery in the storing case in advance for accumulating the electromotive force that is generated by the solar battery.

The features of multi information recording medium, label selecting means, label areas, labels, a recording method of recording information, and the like not described in this embodiment are as set forth in the first embodiment.

Third Embodiment

Figure 13:
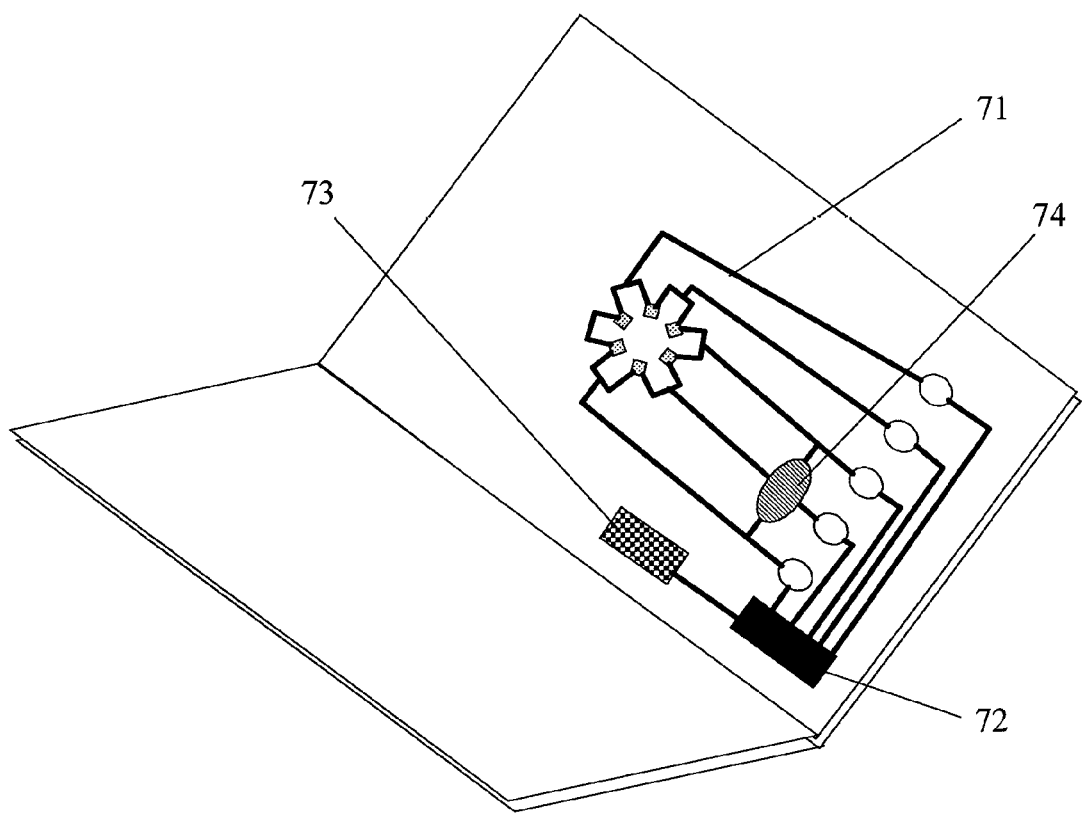
FIG. 13 is a view showing a method of selecting multiple label layers.

FIG. 13 shows an example of displaying a multicolor label by selecting three layers simultaneously as the label layers described in the first and second embodiments. In this embodiment, wiring lines are configured to apply a voltage simultaneously to three label layers when a label button 74 is pressed. The three label layers in this case are respectively made of different electrochromic materials selected so as to display mutually different colors by the layers.

A $WO_3$ layer is used as the electrochromic layer in the film structure of a label A. In this way, the layer A exhibits a blue color upon voltage application. An $Au$—$V_2O_5$ layer is used as the electrochromic layer in the film structure of a label B. In this way, the layer B exhibits a green color upon voltage application. A $Cu$—$V_2O_5$ layer is used as the electrochromic layer in the film structure of a label C. In this way, the layer C exhibits a red color upon voltage application.

Although the ratio of the label areas to the entire disc is increased by increasing the number of layers to be used as label layers, it is possible to display delicate colors by increasing the number of label layers, and therefore to achieve more beautiful label display. It is also possible to use additional three layers as label layers for displaying another label, or a single layer as an additional label layer may be used for displaying the subsequent label. Such combinations can be made freely.

Moreover, the number of the label layers may be increased up to 7 layers to obtain 7 colors, for example, for the purpose of forming more delicate color tones as a label image by increasing color tones. In this way, it is possible to obtain even more beautiful label display.

Fourth Embodiment

Figure 14:
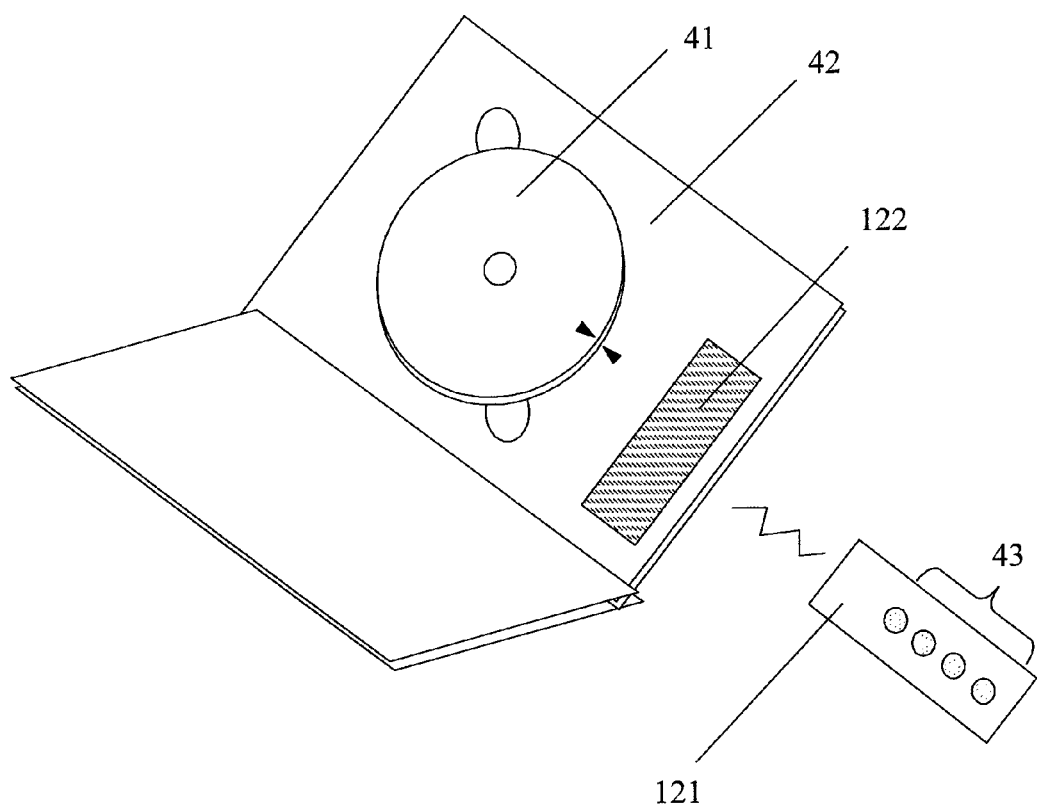
FIG. 14 is a view showing another example of changing the label displays.

FIG. 14 shows an example of using light as selecting means for the label layers described in the first to third embodiments. Here, it is possible to select a label layer by irradiation of the light. A remote controller 121 is provided herein for selecting the layer from outside, and the light is irradiated on a light-receiving portion 122. Usual infrared rays are used as the light source of the remote controller 121. When a label a is selected with label selecting means 43 on the remote controller, a voltage is applied to the electrode corresponding to the label a to display the label a. Similarly, when a label b is selected with the remote controller, a voltage is applied to the electrode corresponding to the label b to display the label b. When a label c is selected, the label c is displayed.

Alternatively, it is possible to select the three layers at the same time as the label layers by arranging wiring lines as shown in FIG. 13 so as to apply a voltage simultaneously to the three label layers. In addition, it is also possible to use additional three layers as the label layers for displaying another label, or a single layer as the additional label layer may be used for displaying the subsequent label. Such combinations can be made freely.

As described above, it is not necessary to provide buttons for selecting the layers inside the storing case since the changing of the labels can be performed with an optical switch. Therefore, it is possible to realize the storing case with a simple configuration.

Figure 15:
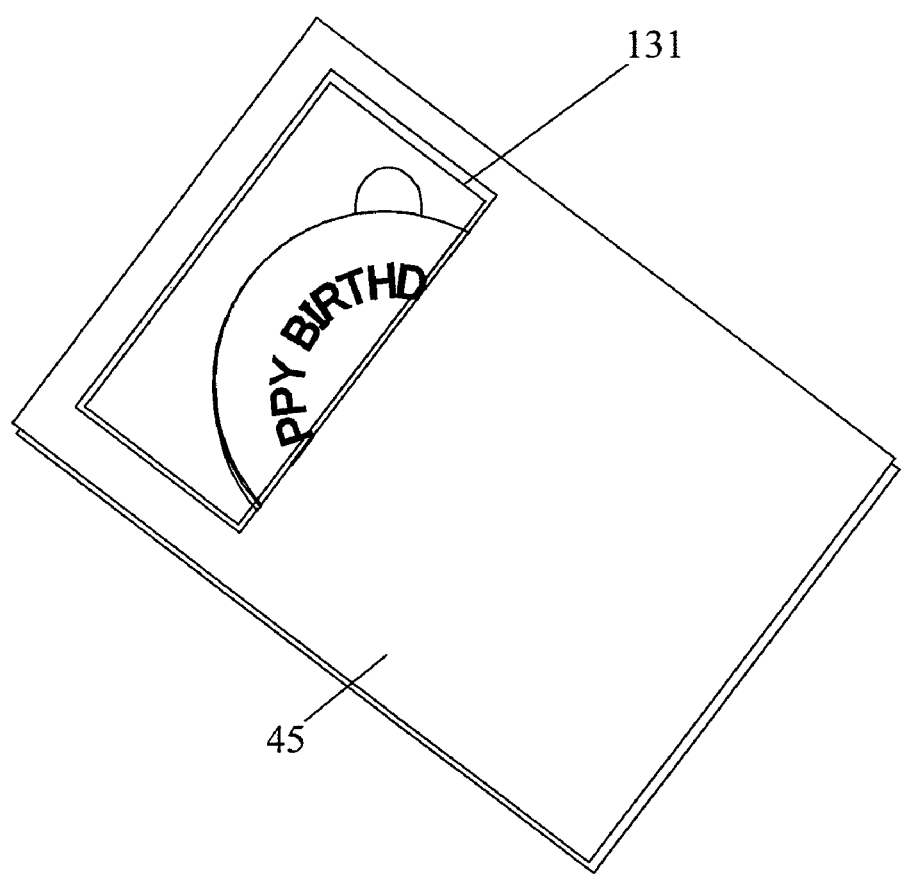
FIG. 15 is a view showing an example of an aperture on the storing case.
Figure 16:
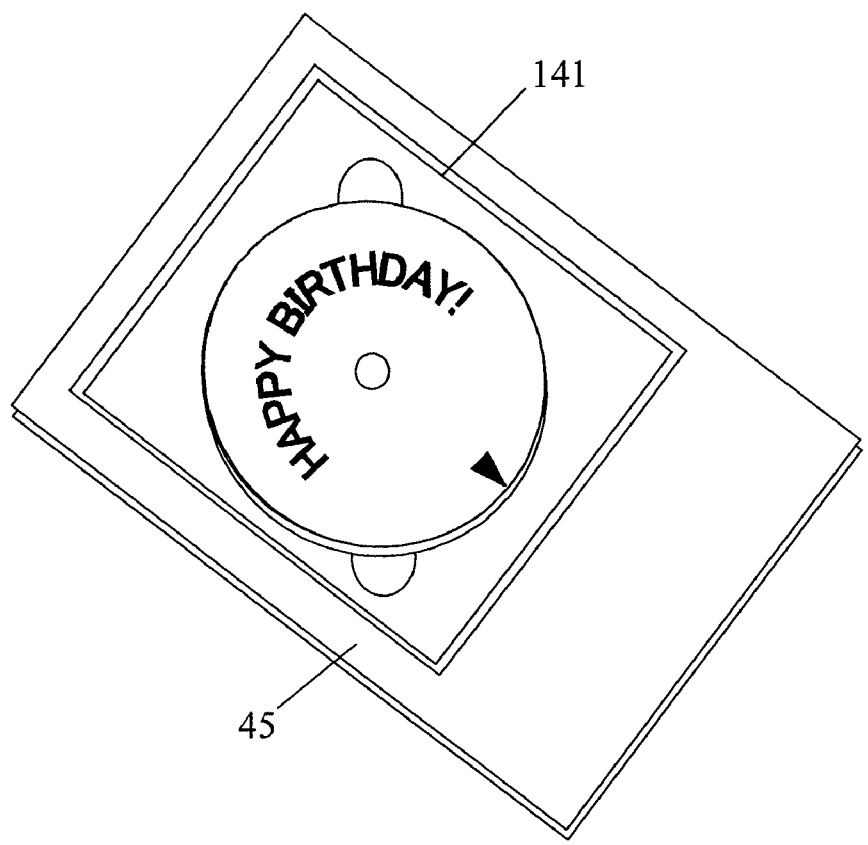
FIG. 16 is a view showing another example of the aperture on the storing case.

It is possible to stop the label display when the storing case is closed, and to display the label by opening the storing case. Alternatively, it is also possible to provide the storing case with the aperture and/or the transparent portion as shown in FIGS. 15 and 16 so that a user can see the disc inside either partially or entirely. Another possible option is to stop the voltage supply at a lapse of predetermined time.

Fifth Embodiment

This embodiment will further describe a method of specifying a combination of a medium and a storing case by use of the label changing means described in the first to fourth embodiments. Here, the storing case may be designed for a specific disc, and has a structure in which the label is displayed only when the disc matches the storing case.

Figure 17:
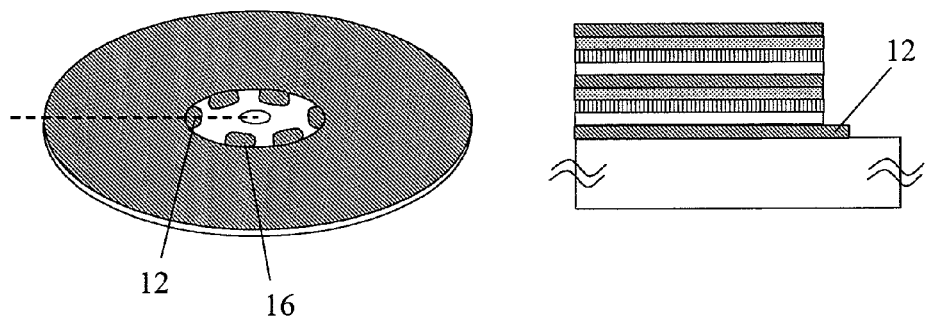
FIGS. 17A to 17C are views showing examples of layouts of the transparent electrodes in the information recording medium and the terminals for applying voltage on the storing case.
Figure 17:
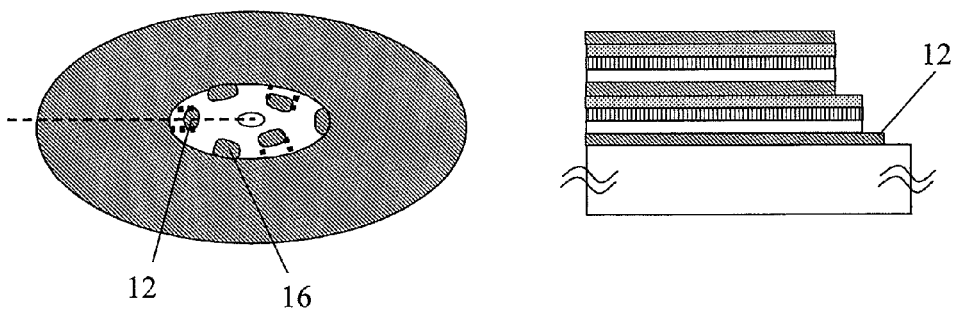
Figure 17:
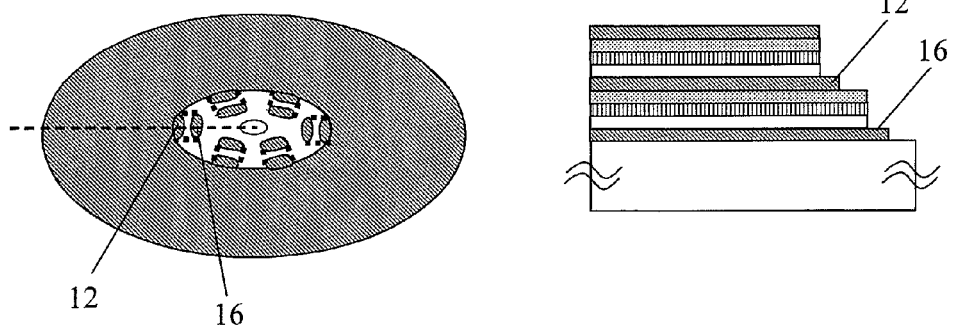

In this embodiment, for example, the positions of the transparent electrodes formed at the inner peripheral portion of the disc and the positions of the terminals for applying voltage formed on the storing case corresponding to the disc are located at the positions from those for other discs. FIG. 17A shows the layout of the different transparent electrodes formed at the inner peripheral portion of the disc shown in FIG. 2 in the first embodiment, while FIGS. 17B and 17C show layout examples of the electrodes on the discs in this embodiment. In the case of the transparent electrodes arranged as shown in FIG. 17A, the positions of the first transparent electrode and the second transparent electrode are aligned in the circumferential direction. In the case of the disc shown in FIG. 17B, radial positions from the center of the disc are different between the first transparent electrodes and the second transparent electrodes. Accordingly, even when the disc FIG. 17B is stored in the storing case on which the electrodes are deposited as in the case of FIG. 17A, the label is not displayed because a voltage is not applied to the electrodes due to deviation of the positions of one of the electrodes. In the case of the disc shown in FIG. 17C, the radial positions and the circumferential positions are different between the first transparent electrodes and the second transparent electrodes. As a result, the label is not displayed, similarly. FIG. 17C also illustrates the layers constituting the electrodes. Here, only the electrode portions are required to be exposed on the surface. The disc is produced by stacking layers sequentially from the bottom by using appropriate masks to expose the electrode layers as illustrated in FIG. 17C. The label can be displayed and multiple labels can be changed to be displayed only when the positions between the terminals connected to the transparent electrodes of the disc and the terminals for applying voltage on the storing case are fitted to each other.

According to the present invention, it is possible to obtain the information recording medium and the storing case of a collection type, which place importance on originality.

Sixth Embodiment

Figure 18:
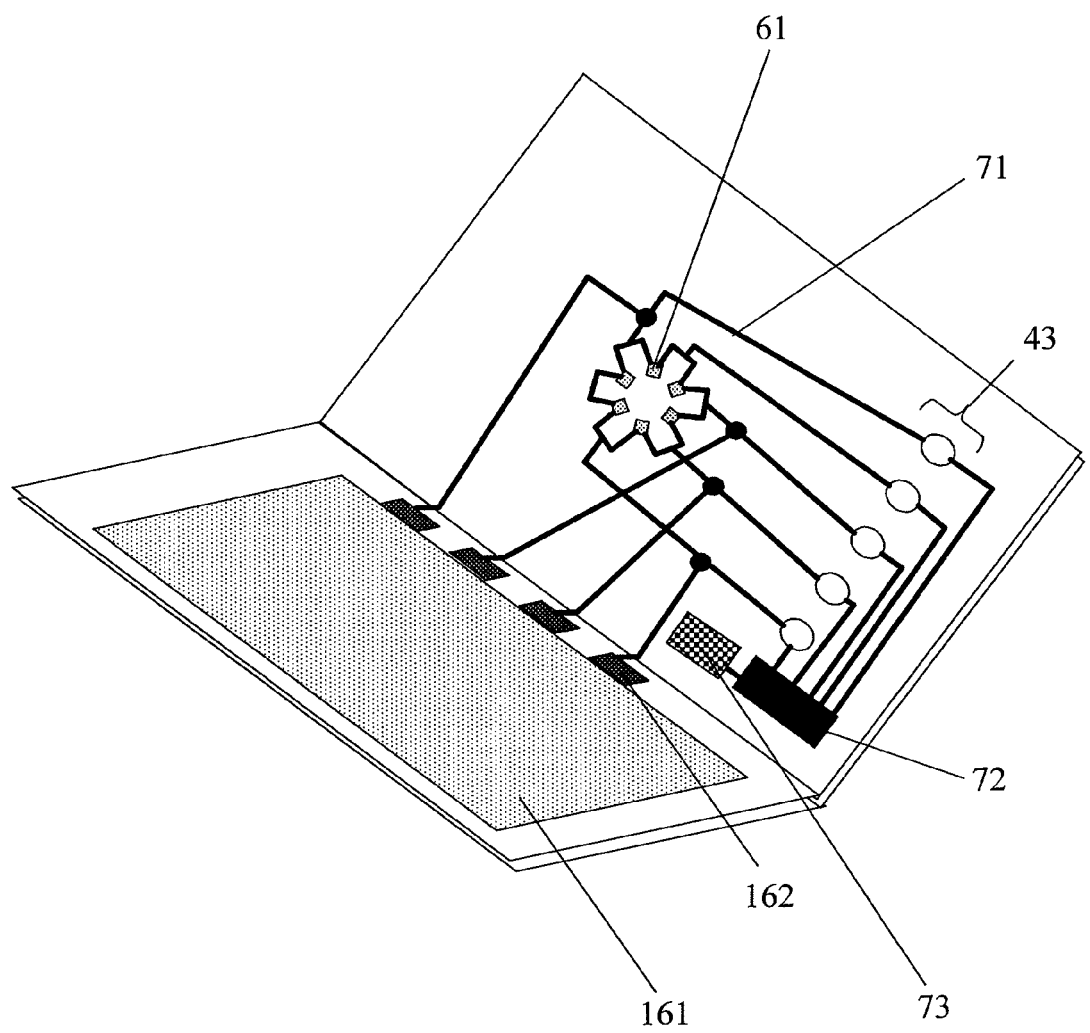
FIG. 18 is a view showing another configuration example of the storing case.
Figure 19:
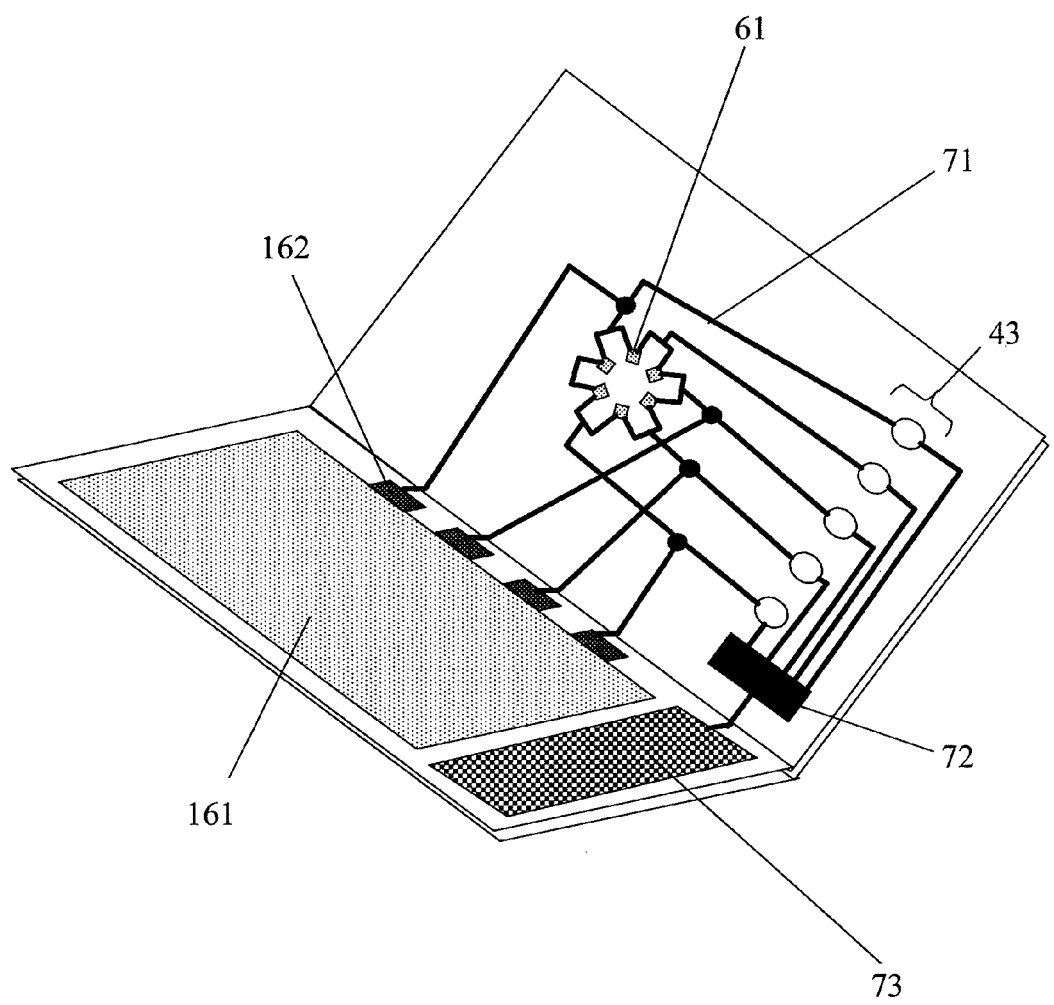
FIG. 19 is a view showing still another configuration example of the storing case.
Figure 20:
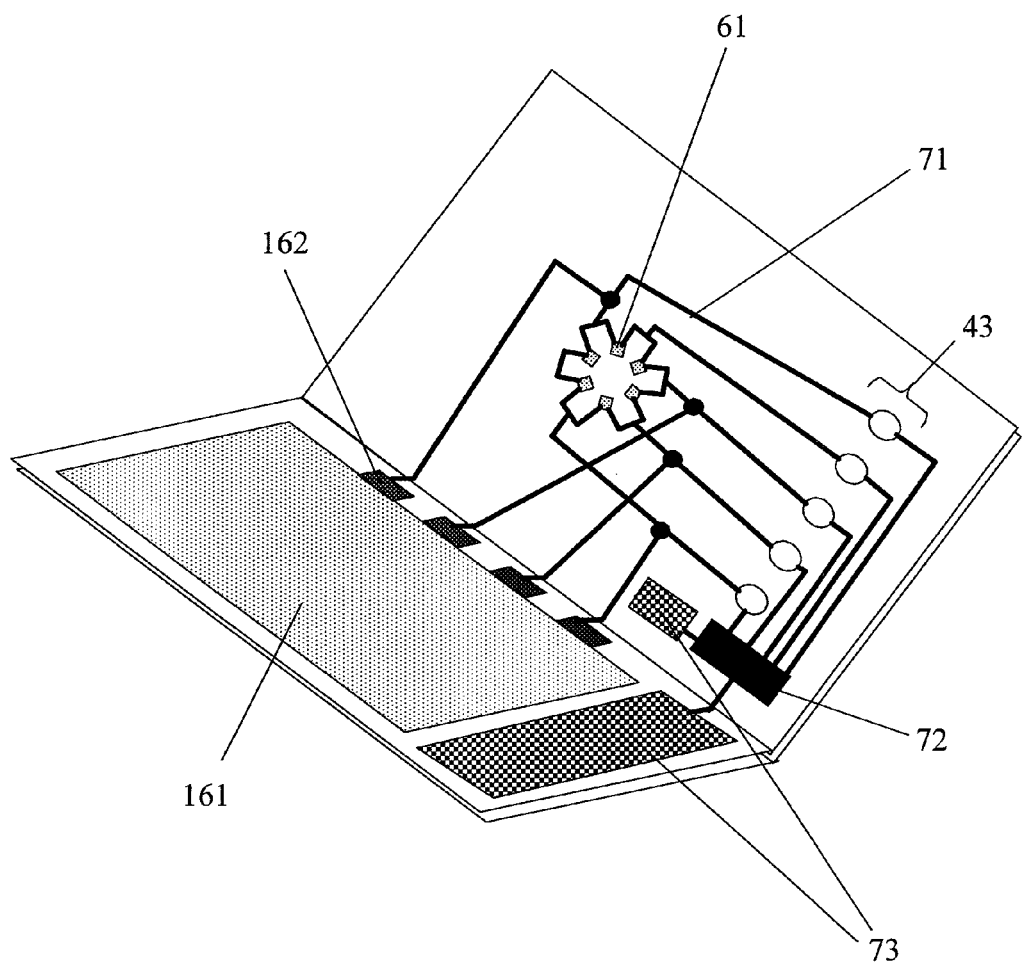
FIG. 20 is a view showing yet another configuration example of the storing case.

This embodiment will describe other examples of storing cases. To realize a storing case having originality, the storing case may be provided with a dedicated label as well. In this embodiment, the storing case has a configuration as illustrated in FIG. 18. This storing case includes a label 161 formed on the case, electrodes 162 for the label layers on the storing case, terminals 61 for applying voltage, voltage source 73, voltage supplying means 72, label selecting means 43, and wiring lines 71 for connecting these constituents. FIG. 18 shows an example of using a small battery as a voltage source. Meanwhile, FIG. 19 shows an example of using a solar battery, and FIG. 20 shows an example of using a solar battery and a battery.

Figure 21:
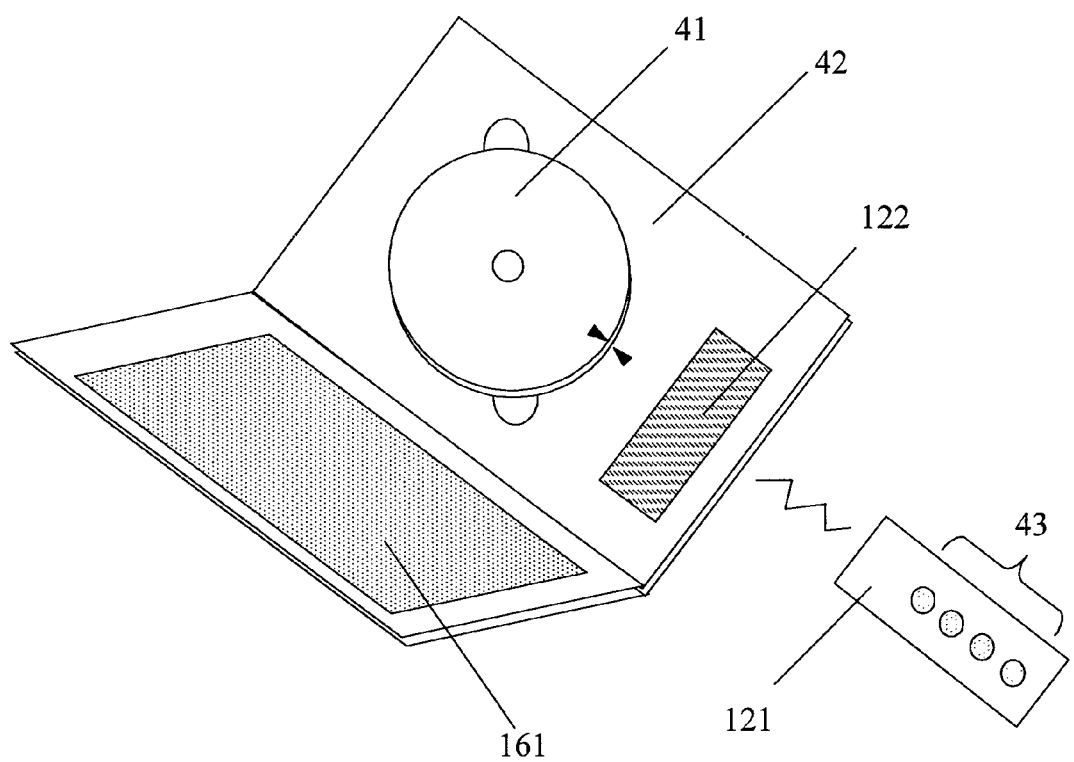
FIG. 21 is a view showing a method of changing labels on the storing case.

Label information is recorded in advance on the label layers on the storing case. Here, the storing case is configured to display the label thereon only when a dedicated disc is set on, and a voltage is applied to the electrodes. Since the recording of the label information in this case is not performed on the disc, the recording is performed by converting the recorded positions into x-y coordinate information instead of performing the recording by rotation. It is more impressive to display labels on the disc and the storing case at the same time by arranging the label display in combination of the two. Of course, it is possible to select to display the labels only on the storing case or to display the labels only on the disc. The label layers provided on the storing case may have the same configuration as those on the disc. Alternatively, it is possible to adopt the combination with electronic paper used as the label. The electronic paper requires electric power for image display only when the label display is changed, and therefore has an advantage of low power consumption (refer to: http://jp.fujitsu.com/group/labs/techinfo/techguide/list/paper.html). Concerning the label selection, a color on a layer sandwiched by two transparent electrodes is displayed as in the case of the disk of the voltage-selection-type. Liquid crystal layers corresponding to red, green, and blue may be selected at the same time to realize a full-color label. Moreover, as for the method of changing the labels, as shown in FIG. 21, it is possible to change the labels by transmitting the signal for information on labels recorded in advance to a light-receiving portion 122 by use of light such as infrared rays.

What is claimed is:

1. A storing case for storing an information recording medium, which is provided with an information recording area for recording information by irradiation of energy, a plurality of label areas for recording visible label information, and a plurality of electrode terminals respectively connected to the plurality of label areas, and in which a label written in each of the label areas is visibly displayed when a voltage is applied from the electrode terminals to each of the label areas, the storing case comprising:
  a storing part for storing the information recording medium;
  terminals for applying voltage disposed in positions to be connected to the electrode terminals of the information recording medium stored in the storing part;
  selecting means which selects the terminals for applying voltage; and
  a power source for applying voltage to the selected terminals for applying voltage.

2. The storing case according to claim 1,
  wherein the information recording medium is a multi-layer medium including a plurality of recording layers, and
  the plurality of label areas correspond to the recording layers, respectively.

3. The storing case according to claim 1, wherein the power source includes a solar battery and a battery.

4. The storing case according to claim 1, wherein the selecting means includes a mode to select a plurality of the terminals for applying voltage simultaneously.

5. The storing case according to claim 1, further comprising:
  a receiving part for receiving a remote controller signal,
  wherein the selecting means selects the terminals for applying voltage based on the remote controller signal received by the receiving part.

6. The storing case according to claim 1, further comprising: a lid member which opens and closes freely for covering the storing part,
  wherein the lid member includes a window portion through which at least part of the information recording medium stored in the storing part is visible.

7. The storing case according to claim 1, further comprising:
  a lid member which opens and closes freely for covering the storing part,
  wherein the lid member includes the label layer for recording the label information and for visibly displaying the label information when a voltage is applied to the lid member via the selecting means.

8. The storing case according to claim 7, wherein the label layer is an electronic paper.

9. An information recording medium storing system comprising:
  an information recording medium including an information recording area for recording information by irradiation of energy, a plurality of label areas for recording visible label information, and a plurality of electrode terminals respectively connected to the plurality of label areas, the information recording medium being configured to display a label written in each of the label areas visibly when a voltage is applied from the electrode terminals to each of the label areas; and
  a storing case including a storing part for storing the information recording medium, terminals for applying voltage disposed in positions to be connected to the electrode terminals of the information recording medium stored in the storing part, selecting means which selects the terminals for applying voltage, and a power source for applying voltage to the selected terminals for applying voltage.

10. The information recording medium storing system according to claim 9,
  wherein the information recording medium is a multi-layer medium including a plurality of recording layers, and
  the plurality of label areas correspond to the recording layers, respectively.

11. The information recording medium storing system according to claim 10, wherein each of the recording layers includes an electrochromic layer sandwiched by a pair of transparent electrodes.

12. The information recording medium storing system according to claim 11,
  wherein the plurality of label areas respectively include the plurality of recording layers for displaying mutually different colors, and
  the selecting means includes a mode to simultaneously select a plurality of the terminals for applying voltage corresponding to the plurality of recording layers for displaying mutually different colors.

13. The information recording medium storing system according to claim 9, wherein the power source includes a solar battery and a battery.

14. The information recording medium storing system according to claim 9, further comprising: a receiving part for receiving a remote controller signal,
  wherein the selecting means selects the terminals for applying voltage based on the remote controller signal received by the receiving part.

15. The information recording medium storing system according to claim 9, further comprising: a lid member which opens and closes freely for covering the storing part,
  wherein the lid member includes a window portion through which at least part of the information recording medium stored in the storing part is visible.

16. The information recording medium storing system according to claim 9, further comprising: a lid member which opens and closes for covering the storing part,
  wherein the lid member includes a label layer for recording the label information and for visibly displaying the label information when a voltage is applied to the lid member via the selecting means.

17. The information recording medium storing system according to claim 16, wherein the label layer is an electronic paper.

* * * * *